United States Patent
Ore

(10) Patent No.: US 6,176,146 B1
(45) Date of Patent: Jan. 23, 2001

(54) OUTPUT SHAFT ARRANGEMENT FOR MANUAL TRANSMISSION AUXILIARY BOXES

(75) Inventor: Thomas G. Ore, Kalamazoo, MI (US)

(73) Assignee: ZF Meritor, LLC, Maxton, NC (US)

( * ) Notice: Under 35 U.S.C. 154(b), the term of this patent shall be extended for 0 days.

(21) Appl. No.: 09/191,853

(22) Filed: Nov. 12, 1998

(51) Int. Cl.⁷ ...................................... F16H 3/02
(52) U.S. Cl. .................. 74/331; 74/330; 74/333
(58) Field of Search ............... 74/325, 330, 331, 74/333

(56) References Cited

U.S. PATENT DOCUMENTS

| | | | |
|---|---|---|---|
| 3,673,890 | * | 7/1972 | Crooks .................................. 74/331 |
| 4,152,949 | * | 5/1979 | Vandervoort et al. ................. 74/331 |
| 4,754,665 | * | 7/1988 | Vandervoort ........................ 74/331 X |
| 4,831,894 | * | 5/1989 | Braun ................................ 74/331 X |
| 4,876,924 | * | 10/1989 | Fletcher et al. .................... 74/331 X |
| 5,394,772 | * | 3/1995 | Stine et al. ......................... 74/331 X |
| 5,398,563 | * | 3/1995 | Stine ................................. 74/331 |

FOREIGN PATENT DOCUMENTS

4205668 * 8/1993 (DE) ...................................... 74/333

* cited by examiner

Primary Examiner—Charles A. Marmor
Assistant Examiner—Ha Ho
(74) Attorney, Agent, or Firm—Carlson, Gaskey & Olds

(57) ABSTRACT

A manual transmission has a main gear box and an auxiliary box with an input shaft extending along an axis from a first end that extends into the auxiliary box for transmitting power to the auxiliary box. The auxiliary box has an output shaft having a second end adjacent the input shaft and coaxial with the axis for transmitting power out of the auxiliary box. A first gear is supported by the input shaft at the first end, and a second and third gear are supported by the output shaft. At least one countershaft having fourth, fifth, and sixth gears affixed to a shaft engages the first, second, and third gears, respectively. A synchronizer and a clutch collar are supported by the output shaft for engaging one of the first, second, and third gears. The arrangement eliminates an intermediate shaft that was required in the prior art.

12 Claims, 5 Drawing Sheets

OUTPUT SHAFT ARRANGEMENT FOR MANUAL TRANSMISSION AUXILIARY BOXES

BACKGROUND OF THE INVENTION

This invention relates to an improved output shaft arrangement for deep reduction and splitter boxes in transmissions.

Prior art heavy duty manual transmission have at least one auxiliary box utilizing an input and output shaft with an intermediate shaft, or quill shaft, interposed between the shafts. Bearings are required to support the intermediate shaft. A synchronizer and a clutch collar are used as engagement mechanisms for engaging the gears within the auxiliary boxes. Both the synchronizer and clutch collar have opposing ends with teeth for engaging the gears and coupling them to the shafts. Typically, one engagement mechanism is supported on the output shaft while the other engagement mechanism is supported by the intermediate shaft. However, this arrangement adds cost and reduces reliability as a result incorporating the intermediate shaft and bearings.

These arrangements have been used for splitter boxes as well as deep reduction gear boxes. To better appreciate the present invention, a prior art auxiliary box 20 is shown in FIG. 1. The auxiliary box 20 includes an input shaft 22 having an axis of rotation A and extends between a first end 24 extending into the auxiliary box 20 for transmitting power to the auxiliary box 20 for increasing or reducing the torque from the input shaft 22. The auxiliary box 20 also includes an output shaft 26 coaxial with axis A for transmitting power out of the auxiliary box at either an increased or reduced torque. Interposed between the input 22 and output 26 shafts and coaxial with axis A is an intermediate shaft 28, or quill shaft. A first gear 30 is supported by the input shaft 22 at the first end 24 which is adjacent the intermediate shaft 28. A second gear 32 is supported by the intermediate shaft 28 and a third gear 34 supported by the output shaft 26. The auxiliary box 20 further includes a pair of countershafts 36 on either side of the input 22, intermediate 28, and output 26 shafts, which allows more power to be transmitted through the auxiliary box 20. Each countershaft 36 has fourth 40, fifth 42, and sixth 44 gears affixed to a shaft 46 for engaging the first 30, second 32, and third 34 gears, respectively. Additional countershafts 36 may also be used.

To selectively transmit power through a particular set of gears, the auxiliary box 20 includes a synchronizer 50 and a clutch collar 52. The synchronizer 50 is supported by the intermediate shaft 28 for engaging one of the first 30 and second 32 gears. The clutch collar 52 is supported by the output shaft 26 for engaging one of the second 32 and third 34 gears. The synchronizer 50 and clutch collar 52 are splined to the shafts 28, 26 in slip-fit relation, that is, they are free to move axially when actuated but are not permitted to rotate relative to the shafts 28, 26. The second 32 and third 34 gears are axially located on the intermediate 28 and output 26 shafts and free to rotate about the shafts when the synchronizer 50 and clutch collar 52 engages neither of the second 32 and third 34 gears. Mechanically actuated shift forks (not shown) engage and manipulate the synchronizer 50 and clutch collar 52 along axis A to effectuate an auxiliary box 20 gear shift.

SUMMARY OF THE INVENTION AND ADVANTAGES

The present invention provides a manual transmission having a main gear box and an auxiliary box comprising an input shaft extending along an axis and having a first end extending into the auxiliary box for transmitting power to the auxiliary box. The auxiliary shaft further comprises an output shaft having a second end adjacent the input shaft and coaxial with the axis for transmitting power out of the auxiliary box. A first gear is supported by the input shaft at the first end, and a second and third gear are supported by the output shaft. At least one countershaft having fourth, fifth, and sixth gears affixed to a shaft engages the first, second, and third gears, respectively. A synchronizer and a clutch collar are supported by the output shaft for engaging one of the first, second, and third gears.

Accordingly, the arrangement of components within the auxiliary boxes of the present invention permits the elimination of the intermediate shaft and the associated bearings thereby reducing cost and increasing reliability of the auxiliary boxes.

The invention has benefits in splitter boxes, deep reduction boxes, and range boxes.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENT

Figure 1:
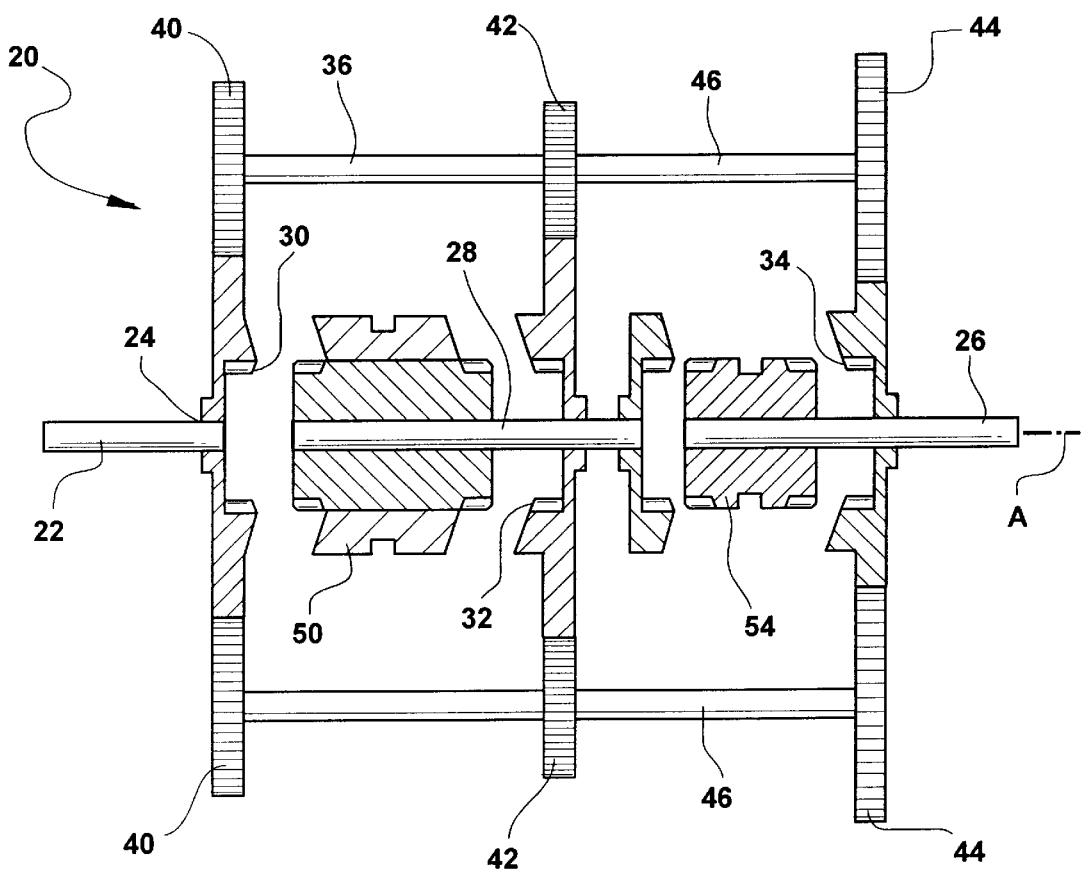
FIG. 1 is a schematic view of a prior art auxiliary box.
Figure 2:
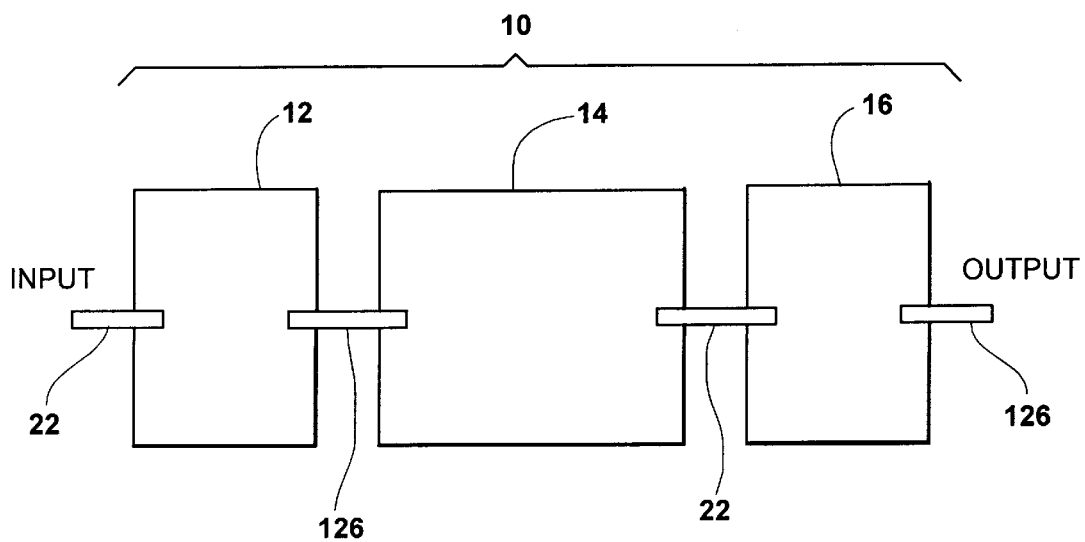
FIG. 2 is a schematic view of a manual transmission having a splitter and a deep reduction box.

A manual transmission is shown at 10 in FIG. 1 having a main gear box 12 and two auxiliary boxes 14, 16. One auxiliary box, the splitter box 14, is located at the output end of the transmission 10 while the other auxiliary box, the deep reduction box 16, is also located at the output end of the transmission 10 adjacent to the splitter box. However, the particular arrangement of the auxiliary boxes does not affect the application of the present invention. The term auxiliary box is intended to refer to either the splitter box 14 or the deep reduction box 16. These auxiliary boxes 14, 16 serve to provide additional gear ratios with respect to the gear ratios provided by the main box 12.

Figure 3:
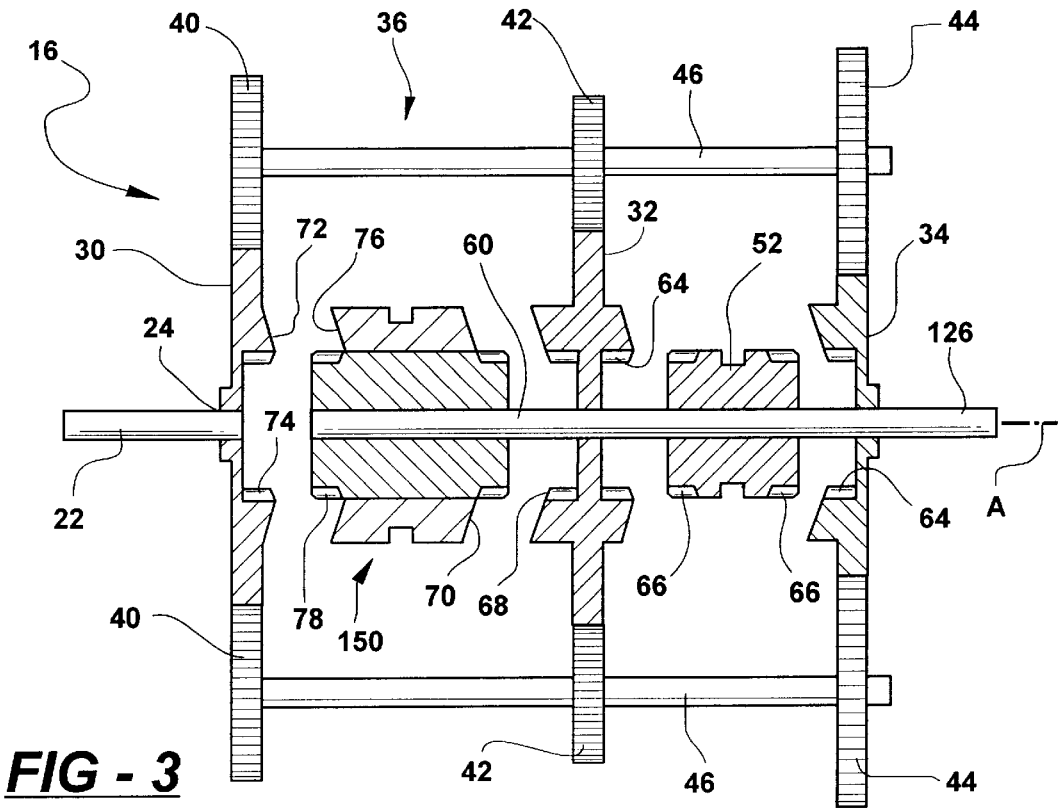
FIG. 3 is a schematic view of a deep reduction box of the present invention.
Figure 4:
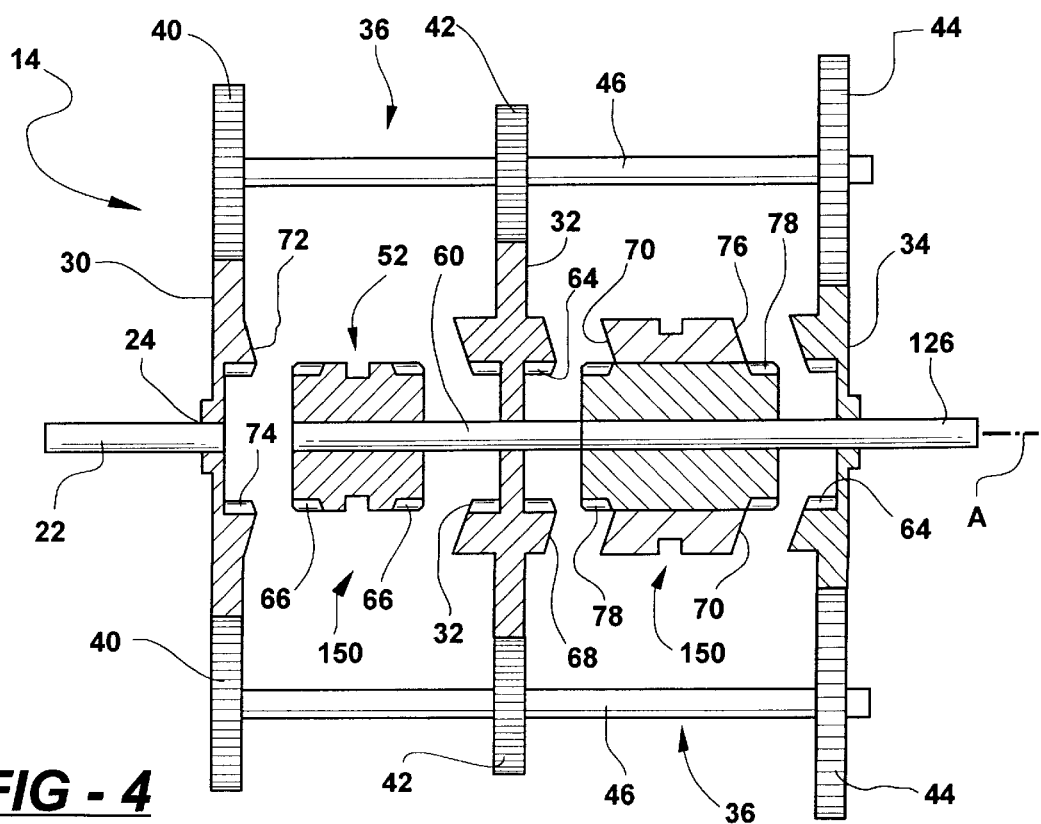
FIG. 4 is a schematic view of a splitter box of the present invention.

Referring generally to FIGS. 3 and 4, the auxiliary boxes 16, 14 incorporate an input shaft 22 and an output shaft 126 having an end 60 adjacent the input shaft 22 and coaxial with axis A. Both the synchronizer 150 and the clutch collar 52 are supported by the output shaft 126 as are the second 32 and third 34 gears. The synchronizer 150 may engage one of the first 30, second 32, and third 34 gears depending upon whether the application is a splitter 14 or deep reduction 16 box. Moreover, the clutch collar 52 may engage one of the first 30, second 32, and third 34 gears depending upon whether the application is a splitter 14 or deep reduction 16 box. As will be appreciated by the following discussion, this arrangement permits the elimination of the intermediate shaft 28 by modification to the auxiliary box components.

Referring specifically to FIG. 3, the deep reduction box 16 comprises an input shaft 22 having a first end 24 extending into the deep reduction box 16 for transmitting power from the to the deep reduction box 16. An output shaft 126 has a second end 60 adjacent the input shaft 22 and coaxial with the axis A for transmitting power out of the deep reduction box 16. The first gear 30 is supported by the input shaft 22 at the first end 24 and the second 32 and third 34 gears are supported by the output shaft 126. As in the prior art, a pair of countershafts 36 having fourth 40, fifth 42, and sixth 44 gears are affixed to a shaft 46 for engaging said first 30, second 32, and third 34 gears, respectively. A synchronizer 150 is supported by the output shaft 126 at the second end 60 and is interposed between the first 30 and second 32 gears for engaging one of the first 30 and second 32 gears. Further, a clutch collar 52 is supported by the output shaft 126 and is interposed between the second 32 and third 34 gears for engaging one of the second 32 and third 34 gears.

The second 32 and third 34 gears are axially located on the output shaft 126 and free to rotate about the output shaft 126 when the synchronizer 150 and clutch collar 52 engages neither of the second 32 and third 34 gears. Said another way, when neither the synchronizer 150 or the clutch collar 52 engages the second 32 or third 34 gears, the countershafts 36 drive the second 32 and third 34 gears about the output shaft 126 but do not drive the output shaft 126. This orientation will be referred to as the neutral position. The synchronizer 150 and clutch collar 52 are splined to the output shaft 126 in slip-fit relation, that is, they are free to move axially but are not permitted to rotate relative to the shaft 126. Thus, the synchronizer 150 and clutch collar 52 rotate with the output shaft 126.

The second 32 and third 34 gears include sets of teeth 64 for engagement with the clutch collar 52. The clutch collar 52 includes opposing ends 66 with sets of teeth for engaging one of the sets of teeth 64 of the second 32 and third 34 gears. These complimentary sets of teeth 64, 66 interlock one of the second 32 and third 34 gears to the output shaft 126 when the clutch collar 52 is moved axially into engagement with one of the second 32 and third 34 gears. In this manner, power is transmitted from the countershaft 36 to the gear that is splined to the output shaft 126 by the clutch collar 52.

The second gear 32 includes a first synchronization surface 68 adjacent the synchronizer 150 for engagement with the synchronizer 150. The synchronizer 150 includes a second synchronization surface 70 adjacent the second gear 32 for engaging the first synchronization surface 68 and synchronizing the second gear 32 and the output shaft 126 when the synchronizer 150 is moved axially into engagement with the second gear 32. Thus, the synchronizer 150 acts to match the speeds of the second gear 32 and the output shaft 126 so that the set of teeth 66 of the clutch collar 52 may engage the set of teeth 64 of the second gear 32 and spline the second gear 32 to the output shaft 126.

The first gear 30 includes a third synchronization surface 72 adjacent the synchronizer 150 and a set of teeth 74 for engagement with the synchronizer 150. The synchronizer 150 includes a fourth synchronization surface 76 opposite the third synchronization surface 72 and adjacent the first gear 30 for engaging the third synchronization surface 72. Engaging the third 72 and fourth 76 surfaces synchronizes the first gear 30 and the output shaft 126 thereby assisting in matching their speeds. The synchronizer 150 further includes a set of teeth 78 adjacent the first gear 30 for engaging the set of teeth 74 of the first gear 30 and interlocking the first gear 30 to the output shaft 126 when the synchronizer 150 is moved axially into engagement with the first gear 30. Thus, the synchronizer 150 acts to match the speed of the first gear 30 and the output shaft 126 and spline the first gear 30 to the output shaft 126.

Figure 5:
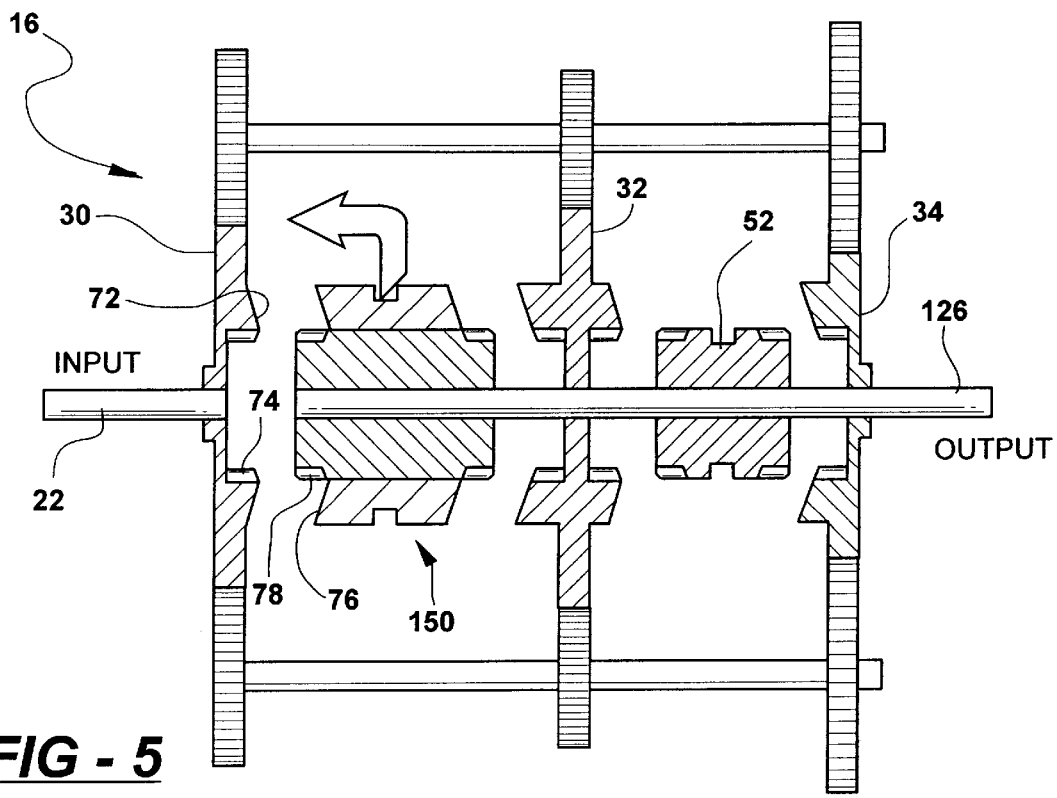
FIG. 5 is a schematic view of the deep reduction box of FIG. 3 depicting the power flow through a first gear combination.
Figure 6:
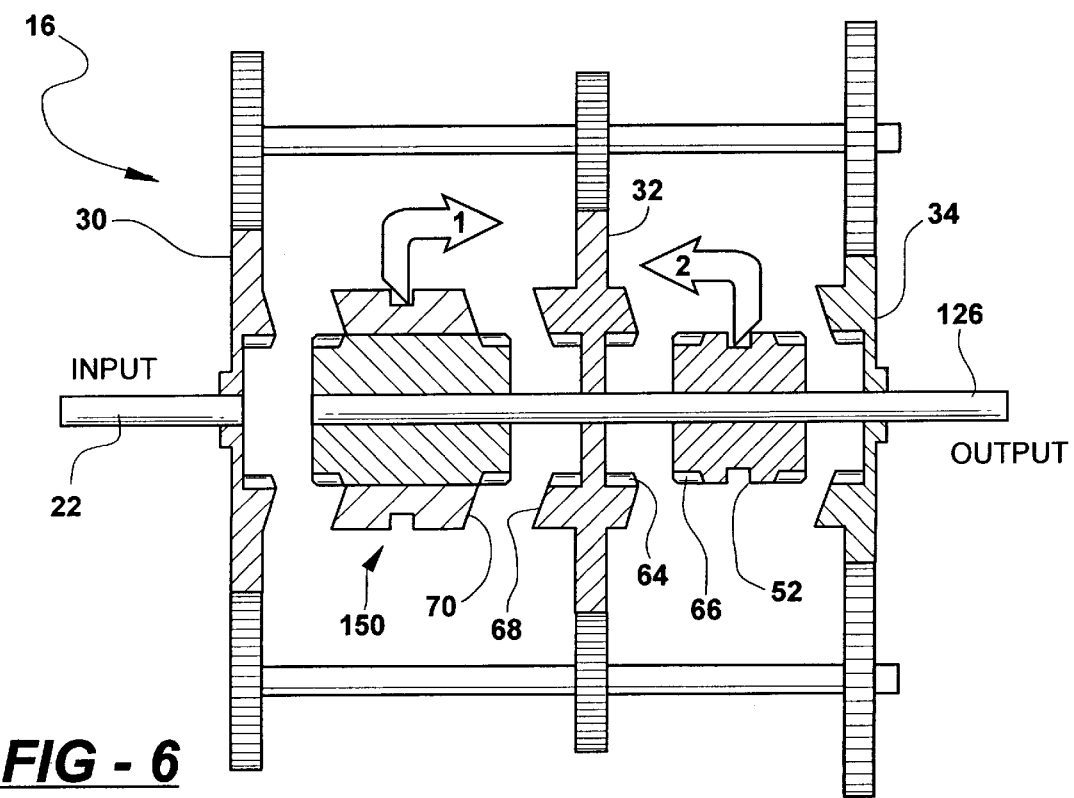
FIG. 6 is a schematic view of the deep reduction box of FIG. 3 depicting the power flow through a second gear combination.
Figure 7:
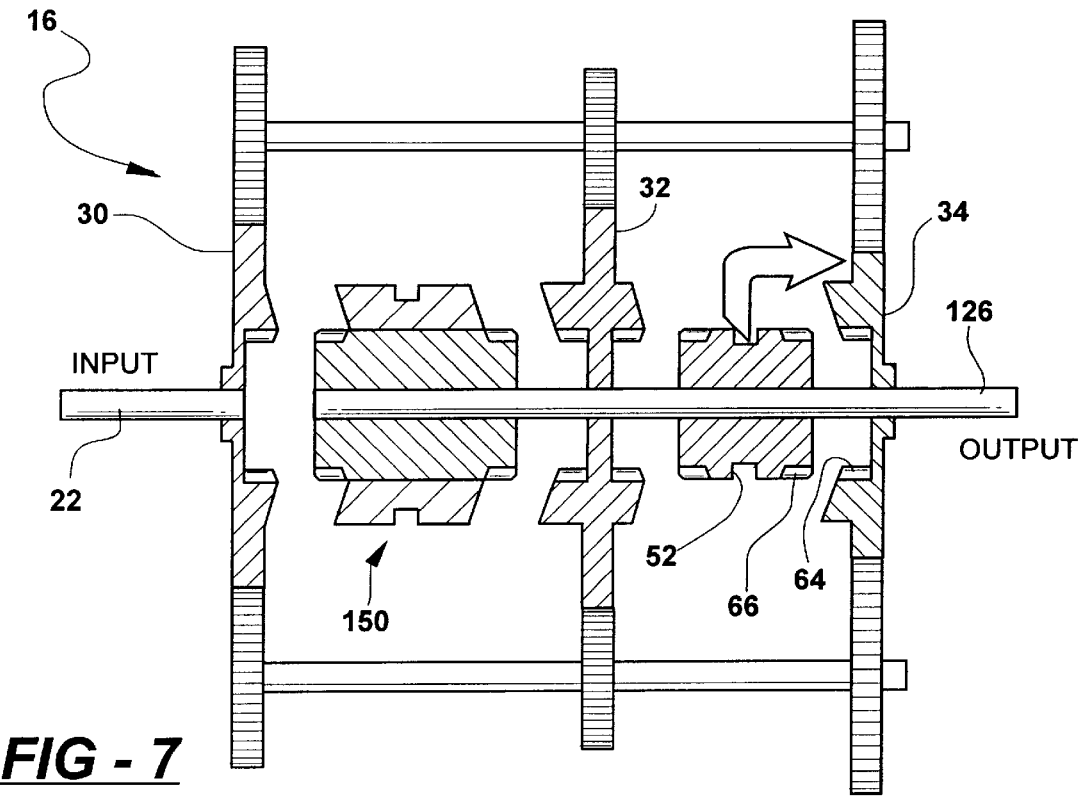
FIG. 7 is a schematic view of the deep reduction box of FIG. 3 depicting the power flow through a third gear combination.

Reference will now be made to FIGS. 5–7 to illustrate the flow of power through the deep reduction box 16 throughout the various deep reduction box gear shifts. Referring to FIG. 5, a first gear combination causes the power to flow through the input shaft 22 directly to the output shaft 126, or high range. In high range the synchronizer 150 will be moved into engagement with the first gear 30 thereby engaging the third 72 and fourth 76 synchronization surfaces and synchronizing the output shaft 126 and the first gear 30. The output shaft 126 and first gear 30 will then be coupled via the complimentary sets of teeth 74, 78. The clutch collar 52 will remain in the neutral position where it neither engages the second 32 nor third 34 gears.

The shifts necessary for a second gear combination is shown in FIG. 6. The low range side of the synchronizer 150 will be moved into engagement with the second gear 32 causing the first 68 and second 70 synchronization surfaces to synchronize the output shaft 126 and the second gear 32. The clutch collar 52 will then be moved into engagement with the second gear 32 thereby coupling the complimentary sets of teeth. In this manner, the power is transmitted from the input shaft 22 through the second gear 32 to the output shaft 126.

Referring now to FIG. 7, a third gear combination is shown. The clutch collar 52 is moved into engagement with the third gear 32 to couple the third gear 32 to the output shaft 126. Since the speed of the output shaft 126 and the third gear 32 must be sufficiently synchronized in order for the clutch collar 52 and third gear 32 to engage without damaging transmission components, a synchronization device may be incorporated. Since the synchronizer 150 is splined to the output shaft 126, the synchronizer 150 may be used to engage the second gear 32 to bring the speed of the output shaft 126 closer to the speed of the third gear 32. If sufficient synchronization is not obtainable in this manner, other mechanical or electrical means may be utilized, as is well known in the art.

Turning now to the splitter box 14, and returning to FIG. 4, comprises an input shaft 22 having a first end 24 protruding into the splitter box 14 for transmitting power into the splitter box 14. The input shaft 22 has an axis A. An output shaft 126 has a second end 60 adjacent the input shaft 22 and coaxial with the axis A for transmitting power out of the splitter box 14. The countershafts 36 and first through sixth gears 30, 32, 34, 40, 42, 44 are arranged in the splitter box 14 in the same manner as the deep reduction box 16.

The clutch collar 52 and synchronizer 150 are both supported by the output shaft 126. However, contrary to the deep reduction box 16, the location of the synchronizer 150 and clutch collar 52 is reversed. That is, the clutch collar 52 is interposed between the first 30 and second 32 gears for engaging one of the first 30 and second 32 gears, and the synchronizer 150 is interposed between the second 32 and third 34 gears for engaging one of the second 32 and third 34 gears.

The first 30 and second 32 gears include sets of teeth 64 for engagement with the clutch collar 52. The clutch collar 52 includes opposing ends 66 with sets of teeth for engaging one of the sets of teeth 64 of the first 30 and second 32 gears. These complimentary sets of teeth 64, 66 interlock one of the first 30 and second 32 gears to the output shaft 126 when the clutch collar 52 is moved axially into engagement with one of the second 32 and third 34 gears. In this manner, power is transmitted from the countershaft 36 to the gear that is splined to the output shaft 126 by the clutch collar 52.

The second gear 32 includes a first synchronization surface 68 adjacent the synchronizer 150 for engagement with the synchronizer 150. The synchronizer 150 includes a second synchronization surface 70 adjacent the second gear 32 for engaging the first synchronization surface 68 and synchronizing the second gear 32 and the output shaft 126 when the synchronizer 150 is moved axially into engagement with the second gear 32. Thus, the synchronizer 150 acts to match the speeds of the second gear 32 and the output shaft 126 so that the sets of teeth 66 of the clutch collar 52 may engage the sets of teeth 64 of the second gear 32 and spline the second gear 32 to the output shaft 126.

The third gear 34 includes a third synchronization surface 72 adjacent the synchronizer 150 and a set of teeth 74 for engagement with the synchronizer 150. The synchronizer 150 includes a fourth synchronization surface 76 adjacent the third gear 34 for engaging the third synchronization surface 72 and synchronizing the third gear 34 and the output shaft 126 thereby matching their speeds. The synchronizer 150 further includes a set of teeth 78 adjacent the third gear 34 for engaging the set of teeth 74 of the third gear 34 and interlocking the third gear 34 to the output shaft 126 when the synchronizer 150 is moved axially into engagement with the third gear 34. Thus, the synchronizer 150 acts to match the speeds of the third gear 34 and output shaft 126 and spline the third gear 34 to the output shaft 126.

Figure 8:
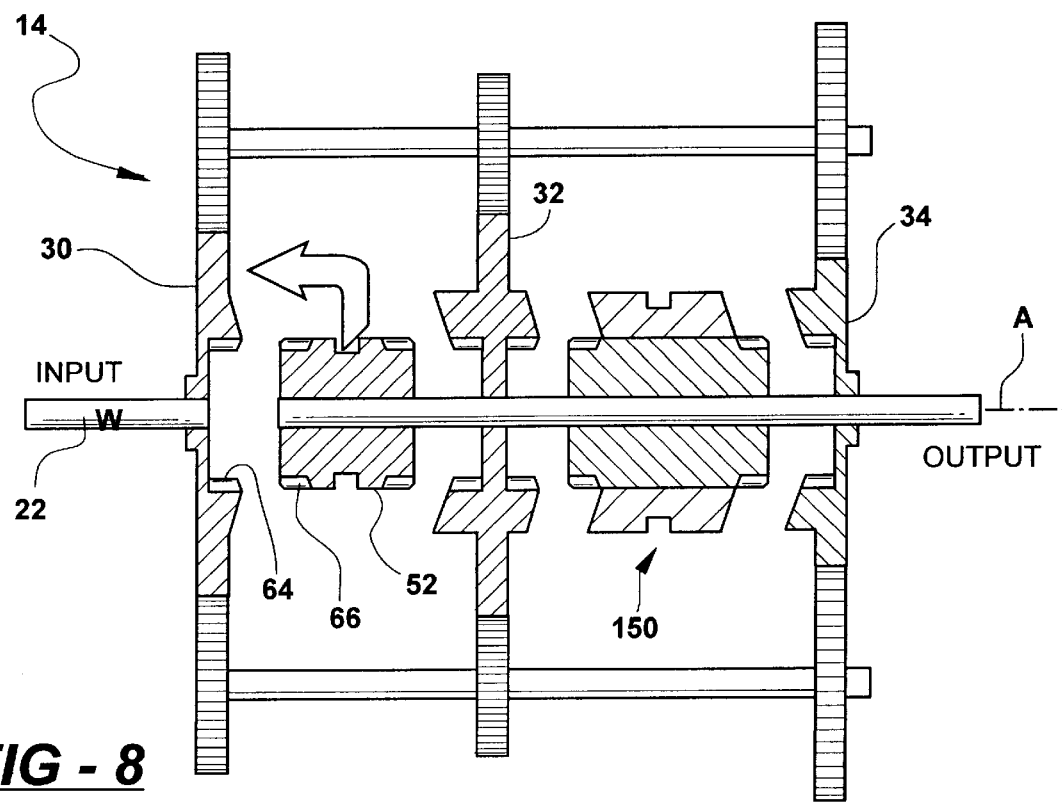
FIG. 8 is a schematic view of the splitter box of FIG. 4 depicting the power flow through a first gear combination.
Figure 9:
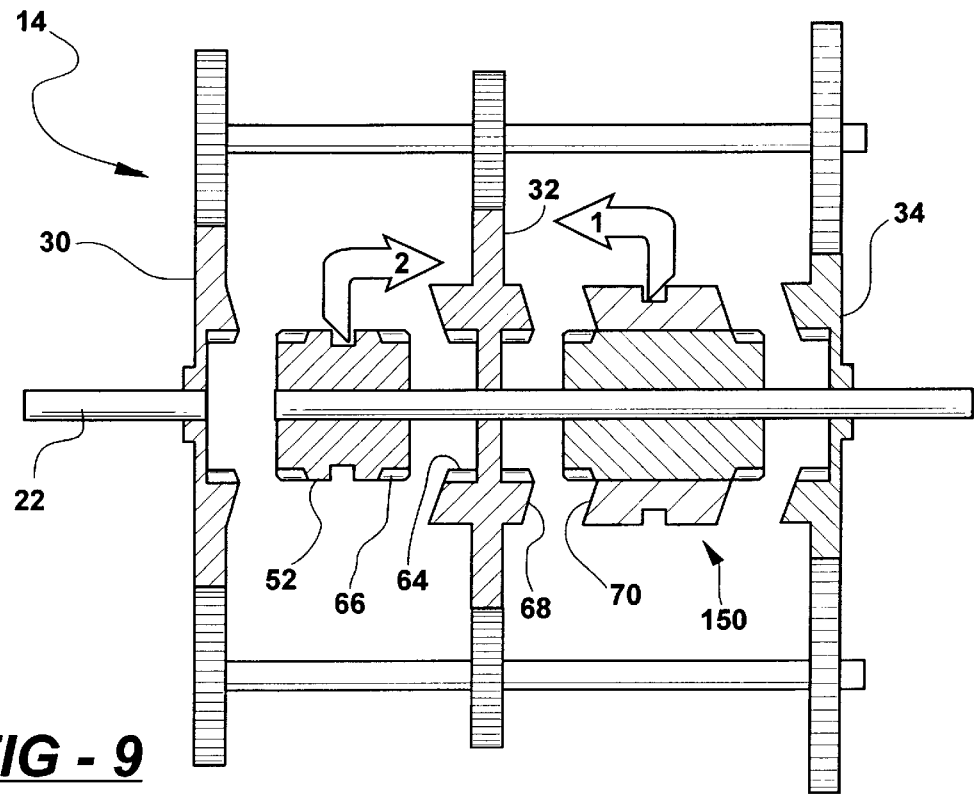
FIG. 9 is a schematic view of the splitter box of FIG. 4 depicting the power flow through a second gear combination.
Figure 10:
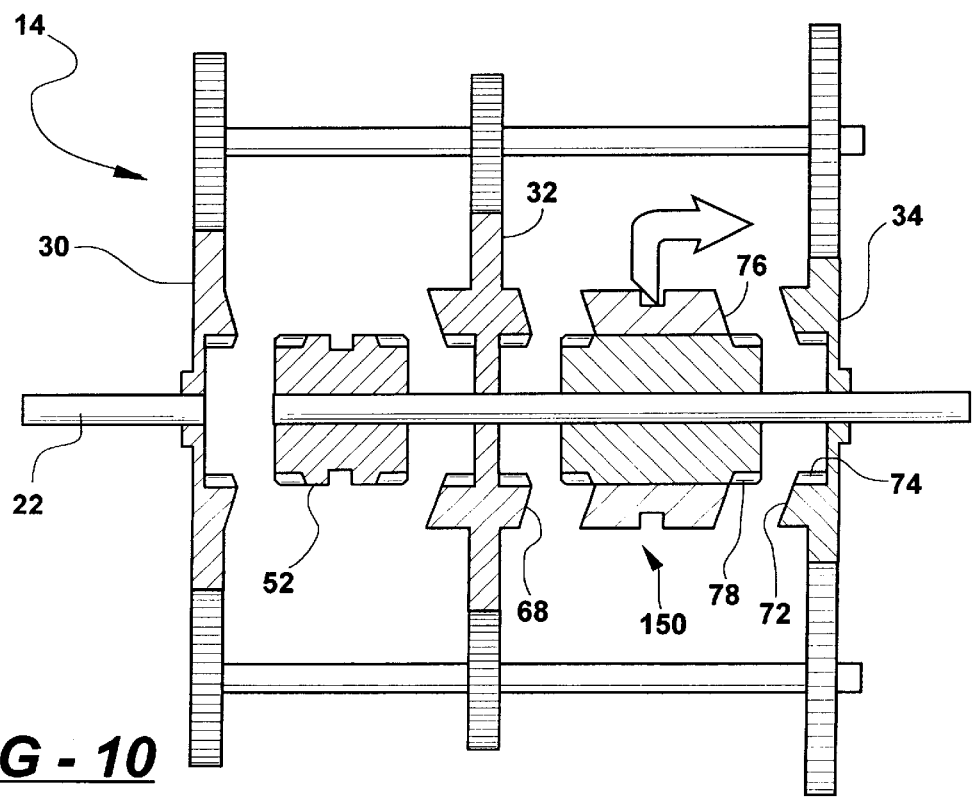
FIG. 10 is a schematic view of the splitter box of FIG. 4 depicting the power flow through a third gear combination.

Reference will now be made to FIGS. 8–10 to illustrate the flow of power through the splitter box 14 throughout the various splitter box 14 gear shifts. Referring to FIG. 8, a first gear combination causes the power to flow through the input shaft 22 directly to the output shaft 126, or low split. In low split the clutch collar 52 will be moved into engagement with the first gear 30. Since the speed of the output shaft 126 and the first gear 30 must be sufficiently synchronized in order for the complimentary teeth 66, 64 of the clutch collar 52 and first gear 30 to engage without damaging transmission components, a synchronization 150 device may be incorporated. Since the synchronizer 150 is splined to the output shaft 126, the synchronizer 150 may be used to engage the second gear 32 to bring the speed of the output shaft 126 closer to the speed of the first gear 30. If sufficient synchronization is not obtainable in this manner, other mechanical or electrical means may be utilized, as is well known in the art.

The shifts necessary for a second gear combination is shown in FIG. 9. The high split side of the synchronizer 150 will be moved into engagement with the second gear 32 causing the first 68 and second 70 synchronization surfaces to synchronize the output shaft 126 and the second gear 32. The clutch collar 41 will then be moved into engagement with the second gear 32 thereby coupling the complimentary sets of teeth 64, 66. In this manner, the power is transmitted from the input shaft 22 through the second gear 32 to the output shaft 126.

Referring now to FIG. 10, a third gear combination is shown. The synchronizer 150 is moved into engagement with the third gear 34 to couple the third gear 34 to the output shaft 126 thereby engaging the third 72 and fourth 76 synchronization surfaces and synchronizing the output shaft 126 and the third gear 34. The output shaft 126 and third gear 34 will then be coupled via the complimentary sets of teeth 74, 78. The clutch collar 52 will remain in the neutral position where it neither engages the first 30 nor second 32 gears.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A transmission having an auxiliary box comprising:

an input shaft receiving rotational drive from a transmission main box and having a first end extending into said auxiliary box for transmitting power to said auxiliary, said input shaft extending along an axis;

an output shaft having a second end adjacent said input shaft and coaxial with said axis for transmitting power out of said auxiliary box;

a first gear supported by said input shaft at said first end;

second and third gears supported by said output shaft;

at least one countershaft having fourth, fifth, and sixth gears affixed to a shaft for engaging said first, second, and third gears respectively;

a synchronizer supported by said output shaft at said second end and interposed between said first and second gears for selectively engaging one of said first and second gears; and a clutch collar supported by said output shaft and interposed between said second and third gears for selectively engaging one of said second and third gears.

2. The transmission as set forth in claim 1 wherein:

said second and third gears are axially located on said output shaft and free to rotate about said output shaft when said synchronizer and clutch collar engages neither of said second and third gears; and said synchronizer and clutch collar are splined to said output shaft in slip-fit relation.

3. The transmission as set forth in claim 2 wherein:

said second and third gears include sets of teeth for engagement with said clutch collar; and said clutch collar includes opposing ends with sets of teeth for engaging one of said sets of teeth of said second and third gears and interlocking one of said second and third gears to said output shaft when said clutch collar is moved axially into engagement with one of said second and third gears.

4. The transmission as set forth in claim 2 wherein:

said second gear includes a first synchronization surface adjacent said synchronizer for engagement with said synchronizer; and said synchronizer includes a second synchronization surface adjacent said second gear for engaging said first synchronization surface and synchronizing said second gear and said output shaft when said synchronizer is moved axially into engagement with said second gear.

5. The transmission as set forth in claim 1 wherein:

said first gear includes a third synchronization surface adjacent said synchronizer and a set of teeth for engagement with said synchronizer; and said synchronizer includes a fourth synchronization surface adjacent said first gear for engaging said third synchronization surface and synchronizing said first gear and said output shaft, said synchronizer further includes a set of teeth adjacent said first gear for engaging said set of teeth of said first gear and interlocking said first gear to said output shaft when said synchronizer is moved axially into engagement with said first gear.

6. A transmission having a splitter box comprising:

an input shaft receiving rotational drive from a transmission main box and having a first end protruding into said splitter box for transmitting power into said splitter box, said input shaft having an axis;

an output shaft having a second end adjacent said input shaft and coaxial with said axis for transmitting power from said splitter box;

a first gear supported by said input shaft at said first end;

second and third gears supported by said output shaft;

at least one countershaft having fourth, fifth, and sixth gears affixed to a shaft for engaging said first, second, and third gears respectively;

a clutch collar supported by said output shaft at said second end and interposed between said first and second gears for selectively engaging one of said first and second gears; and a synchronizer supported by said output shaft and interposed between said second and third gears for selectively engaging one of said second and third gears.

7. The transmission as set forth in claim 6 wherein:

said second and third gears are axially located on said output shaft and free to rotate about said output shaft when said synchronizer and clutch collar engages neither of said second and third gears; and said synchronizer and clutch collar are splined to said output shaft in slip-fit relation.

8. The transmission as set forth in claim 7 wherein:

said first and second gears include sets of teeth for engagement with said clutch collar; and said clutch collar includes opposing ends with sets of teeth for engaging one of said sets of teeth of said first and second gears and interlocking one of said first and second gears to said output shaft when said clutch collar is moved axially into engagement with one of said second and third gears.

9. The transmission as set forth in claim 7 wherein:

said second gear includes a first synchronization surface adjacent said synchronizer for engagement with said synchronizer; and said synchronizer includes a second synchronization surface adjacent said second gear for engaging said first synchronization surface and synchronizing said second gear and said output shaft when said synchronizer is moved axially into engagement with said second gear.

10. The transmission as set forth in claim 6 wherein:

said third gear includes a third synchronization surface adjacent said synchronizer and a set of teeth for engagement with said synchronizer; and said synchronizer includes a fourth synchronization surface adjacent said third gear for engaging said third synchronization surface and synchronizing said third gear and said output shaft, said synchronizer further includes a set of teeth adjacent said third gear for engaging said set of teeth of said third gear and interlocking said third gear to said output shaft when said synchronizer is moved axially into engagement with said third gear.

11. A transmission having an auxiliary box comprising:

an input shaft receiving rotational drive from a transmission main box and having a first end extending into said auxiliary box for transmitting power to said auxiliary box, said input shaft having an axis;

an output shaft having a second end adjacent said input shaft and coaxial with said axis for transmitting power out of the auxiliary box;

a first gear supported by said input shaft at said first end;

second and third gears supported by said output shaft;

at least one countershaft having fourth, fifth, and sixth gears affixed to a shaft for engaging said first, second, and third gears respectively;

a synchronizer supported by said output shaft for selectively engaging one of said first, second, and third gears; and a clutch collar supported by said output shaft for selectively engaging one of said first, second, and third gears.

12. The transmission as set forth in claim 11 wherein:

said second and third gears are axially located on said output shaft and free to rotate about said output shaft when said synchronizer and clutch collar engages neither of said second and third gears; and said synchronizer and clutch collar are splined to said output shaft in slip-fit relation.

* * * * *